United States Patent
Amberg et al.

[11] 3,885,825
[45] May 27, 1975

[54] ARTICLE HANDLING CHUCK

[75] Inventors: Stephen W. Amberg, St. James; Thomas E. Doherty, Setauket, both of N.Y.; Clarence A. Heyne, Sun City, Ariz.

[73] Assignee: Owens-Illinois, Inc., Toledo, Ohio

[22] Filed: July 11, 1973

[21] Appl. No.: 378,336

Related U.S. Application Data
[62] Division of Ser. No. 209,751, Dec. 20, 1971.

[52] U.S. Cl................ 294/115; 198/179; 214/1 BA; 294/87.24
[51] Int. Cl.......................................... B65g 17/20
[58] Field of Search.......... 294/115, 106, 110, 116, 294/87.2, 87.22, 87.24; 198/179, 33 AB; 214/1 BA, 309; 118/500, 503, 322

[56] References Cited
UNITED STATES PATENTS

| | | | |
|---|---|---|---|
| 1,808,689 | 6/1931 | Stenhouse et al. | 294/115 X |
| 2,863,579 | 12/1958 | Meyer | 214/309 |
| 3,069,035 | 12/1962 | Schwarz et al. | 294/87.22 X |
| 3,175,705 | 3/1965 | Houda | 294/115 X |
| 3,302,803 | 2/1967 | Mooney | 214/1 BA |
| 3,549,191 | 12/1970 | Sarkozy et al. | 294/87.24 X |
| 3,637,074 | 1/1972 | Banyas et al. | 209/74 |
| 3,684,078 | 8/1972 | Nielsen | 198/33 AB |
| 3,747,737 | 7/1973 | Brooke | 198/179 X |

*Primary Examiner*—Evon C. Blunk
*Assistant Examiner*—James L. Rowland
*Attorney, Agent, or Firm*—J. R. Nelson

[57] ABSTRACT

The disclosure relates to a machine for making a plastic covering on a rigid base article which in the illustrated form comprises a glass bottle and a conforming shrunken plastic covering thereon.

The machine includes novel subassemblies comprised of a bottle chuck and loading station for assuring proper loading of the bottles on the machine, bottle handling, and unloading device for transfer of the covered bottles to a conveyor and with said transfer smoothening the bottom surface of the covering on the bottle.

12 Claims, 15 Drawing Figures

PATENTED MAY 27 1975 3,885,825

SHEET 5

ARTICLE HANDLING CHUCK

This is a division, of application Ser. No. 209,751 filed Dec. 20, 1971.

The present invention relates to an article handling chuck for use in a machine for making and applying a plastic covering onto a rigid base article, i.e., a glass bottle.

BACKGROUND OF THE INVENTION

The process of copending application, Ser. No. 158,480 filed June 30, 1971, entitled "Method of Making a Plastic-Covered Glass Container" provides a need for an article handling chuck on a production machine to produce the plastic covering on a rigid base article, such as the glass bottle.

SUMMARY OF THE INVENTION

In the present invention, an automatic production machine in a combination of elements is provided for making the succession of cylindrical sleeves on one part of the machine from lengths cut from a roll supply of shrinkable, predecorated plastic web material; and, on another part of the machine, bottles are loaded at spaced centers of a carriage comprised of neck gripping chucks on an endless chain and carriage. The carriage of the machine cooperates in its path with the sleeve making part of the machine in travel on a common vertical axis to perform the transfer and assembly of a sleeve onto a bottle. Manipulations of the bottles in elevation during movement with the endless carriage is by cams on the machine engaging the individual chucks. Along the path of the carriage on either side of the sleeve making turret are substructures of the machine to provide for temperature conditioning of the glass bottle, shrinking the sleeve on the bottle and bottom finishing of the covering combined with unloading the finished article.

In the machine, subcombination structures provide the following:

1. New bottle centering chuck mechanism for loading, conveying, manipulating ahd unloading bottles, the chuck gripping the bottles by the neck and finish portion.

2. Conveyance through bottle handling apparatus on endless carriage extending through a heating tunnel, end-turn whereat assembly steps in the production are performed, thence through a heat tunnel and bottle surface finishing and unloading.

3. Bottle timing and loading to the carriage.

4. Safety feature on the chucks to prevent bottle breakage on misaligned bottles fed by the timing device at loading.

Various combinations of utilization of the subcombinations in the disclosed machine, or in modifications for utilization of the machine for the production of various articles thereon will undoubtedly occur to those skilled in the art. Although a preferred embodiment is herein disclosed, such disclosure is in no way intended as limiting the invention beyond the scope set out in the appended claims.

GENERAL DESCRIPTION OF THE MACHINE

Figure 14:
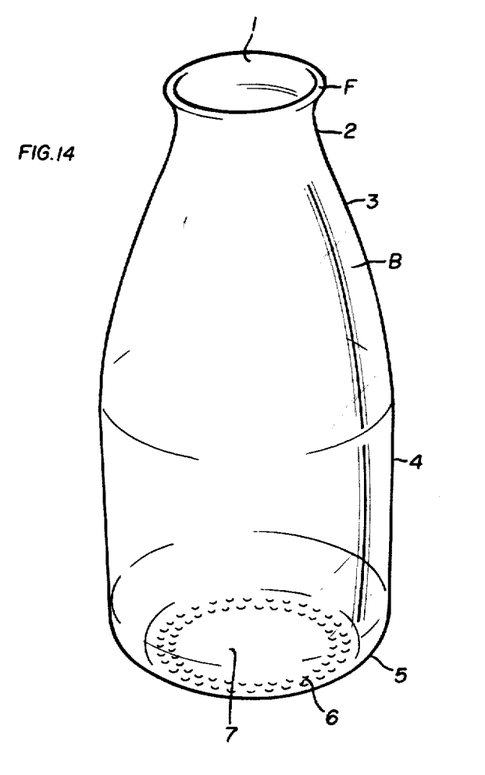
FIG. 14 is a front perspective view of the glass bottle utilized in the assembly with a plastic sleeve.

The machine comprises several components connected together to operate as a unit for production of plastic sleeves shrunken over the rigid base article. The base article in the examples of the present disclosure is a glass bottle B, such as the one shown on FIG. 14.

With a supply of bottles B and supply of prepared plastic 15, the machine has the following components. A bottle infeed guides a line of bottles into a worm spacing them to correspond with the center spacing on overhead bottle chucks. The chucks travel on an endless driven carriage to transport the bottles through a pre-heater (if necessary), past the plastic sleeve forming turret whereat the fabricated sleeves are assembled telescopically, then into and through a tunnel oven at about 400°F wherein the sleeves shrink to conform to the article, and to an unloading station. As seen on FIGS. 1 and 2, the machine may be either of the two disclosed types.

Figure 1:
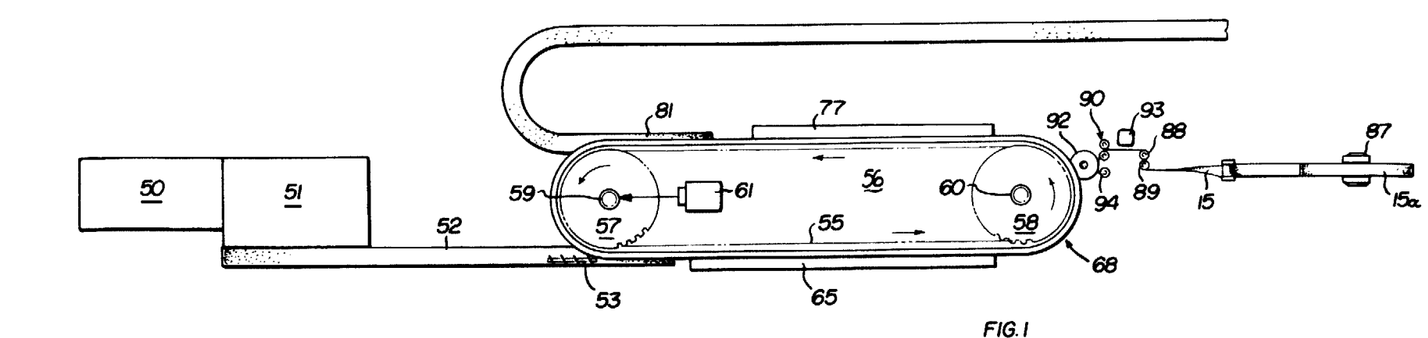
FIG. 1 is a top plan view illustrating the "off-line" embodiment of the invention, wherein bottles are loaded to the machine at approximately room temperature and pre-heated in the machine to condition them for the application of the plastic sleeves.

OFF-LINE EMBODIMENT — FIG. 1

The "off-line" embodiment, as called herein, involves glass bottles that are first manufactured and handled in the normal fashion. The bottles are collected and transported, or stored, and then transported to an area such as a depalletizer unit 50 whereat they are fed through a conventional unscrambler unit 51 and moved in a line or lines onto infeed conveyor 52. Conveyor 52 advances the glass bottles B (see FIG. 14) into the infeed timing worm 53 which spaces the bottles B and times them under linearly spaced chucks 54 of the bottle handling conveyor (see FIG. 3). Chucks 54 (more specifically described hereinafter) are connected at equally spaced intervals on a carriage chain 55 of the bottle handling apparatus 56 traveling in an endless path extending about end turns at the sprockets 57 and 58 supported by their vertical shafts 59 and 60 respectively on handling apparatus 56. The shaft 59 is connected to a drive transmission or gear box (described in detail hereinafter) operated by a drive motor. Carriage 55 for the bottle chucks 54 is driven in a counter-clockwise direction about the endless conveyor path defined by machine sprockets 57 and 58.

Figure 3:
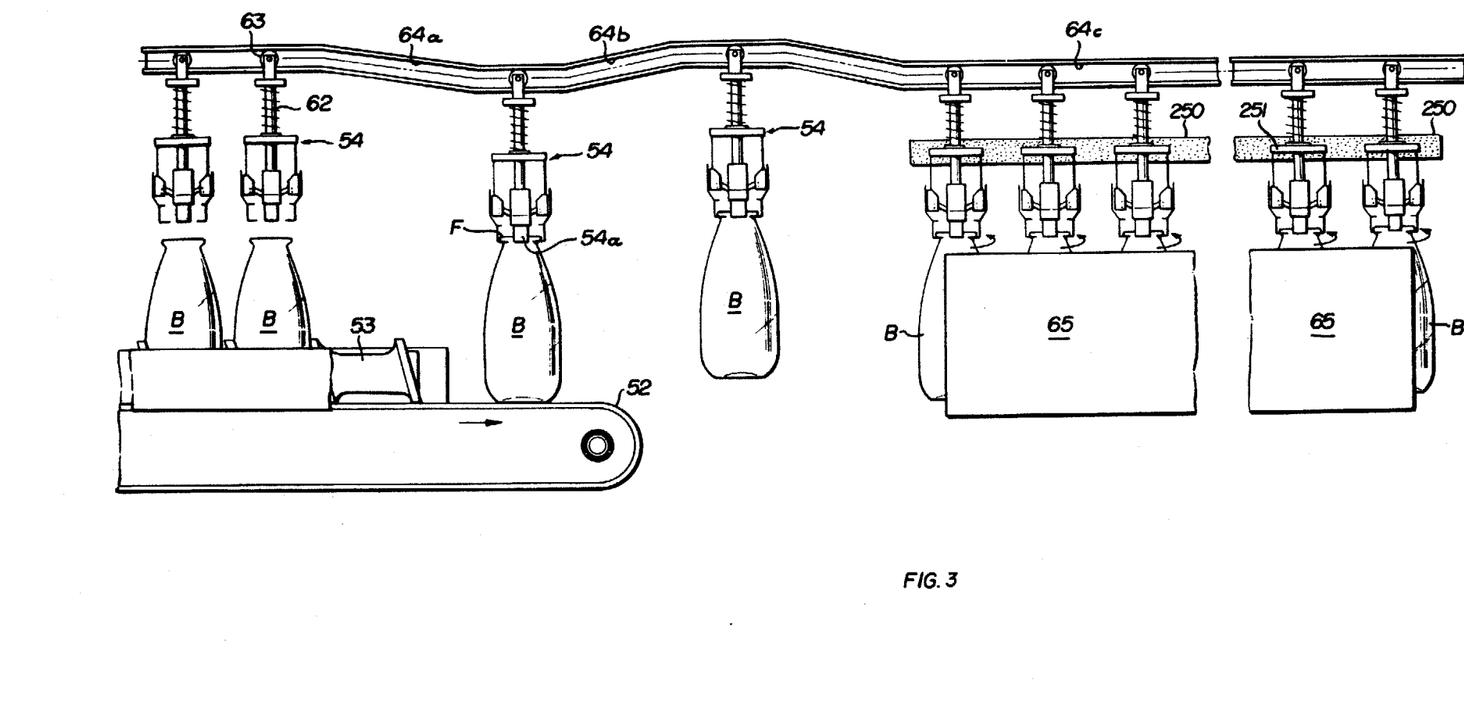
FIG. 3 is a side elevational view of a portion of the bottle handling apparatus of the invention at the bottle loading side of the machine.
Figure 4:
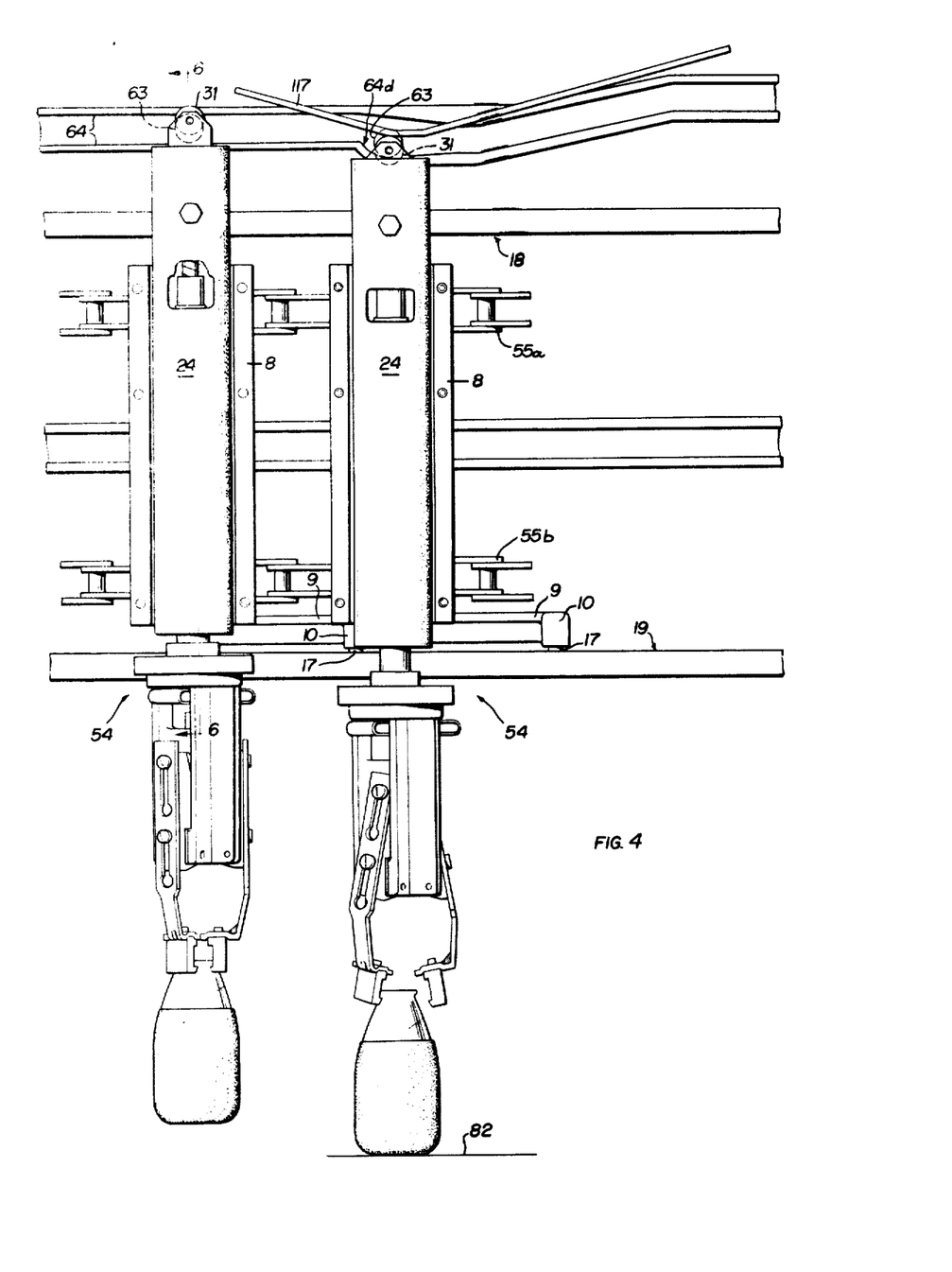
FIG. 4 is a side elevational view of a portion of the bottle handling apparatus including the bottle holding chuck of the invention, the chuck of the apparatus being shown at the bottle unloading station on the machine.
Figure 5:
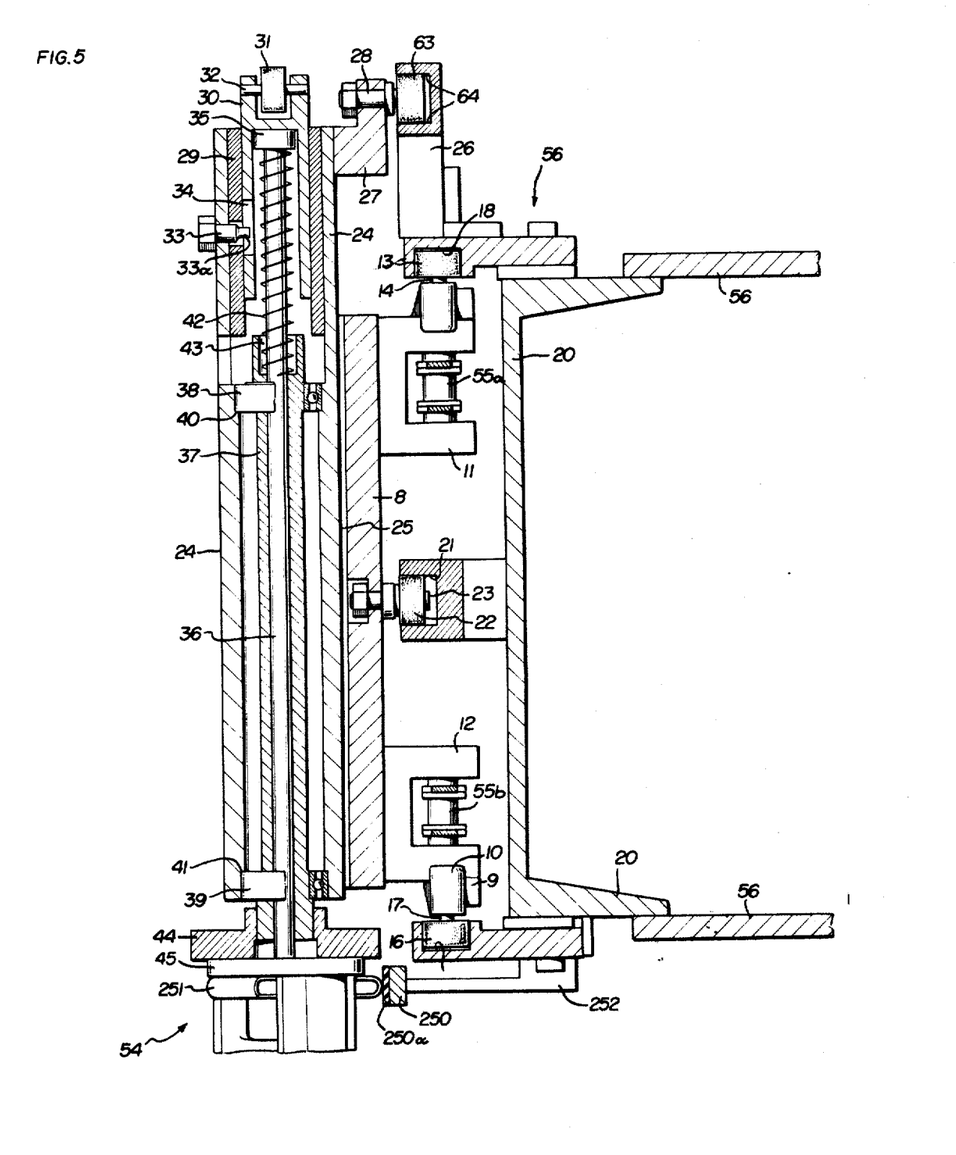
FIG. 5 is a sectional elevational view taken along line 6—6 on FIG. 4.

Referring to FIG. 3, chucks 54 are manipulated in vertical elevation by having their center spindle 62 connected to a roller-follower 63 running in a cam track 64 extending about the path of the carriage 55 on machine 56. As the bottles B are released at the end flight or land of timing worm 53, the axis of bottle B is timed in movement with the center of a chuck 54. The downwardly sloped section 64a of the cam track both lowers the chuck 54 and closes its jaws 54a about the top bead or rim F of the bottle finish, grasping the bottle in the chuck for carrying it with movement of the carriage 55 in the path prescribed thereby. After grasping the bottle, cam section 64b raises and lifts the chuck and bottle from the conveyor 52.

In this, the off-line embodiment of the invention, the bottles B are conditioned thermally by moving them through the heat tunnel 65 containing a source of heat, such as circulating hot air. During preheat, the bottles are preferably rotated, as shown on FIG. 3, by engaging a wheel 251 of the chuck with a stationary rail 250. The wheel running over the friction surface of the rail rotates the chucks and bottles about their central axes during travel of the bottles the length of tunnel 65. Rotation during preheat tends to elevate the bottle temperature more uniformly.

After bottles B emerge from tunnel 65 at elevated temperature, they are carried in a circular path around an end turn at gear 58. Mandrels are spaced equally around the turret of sleeve forming machine 68. The turret forming machine 68 is driven by a differential transmission (not shown) connected to the vertical shaft 60 of the bottle handling machine which is in turn connected to gearing on turret machine 68. Thus, the turret machine 68 is synchronized to move with the carrier 55 and mandrels on the turret machine may be advanced or retarded with respect to the centers of the chuck 54 on carrier 55 by the differential transmission.

The carrier 55 next transverses the length of tunnel 77 in which the bottles are rotated during longitudinal movement. Tunnel 77 is an elongated over chamber heated to a temperature for shrinking the sleeve 69 onto the contours of bottle B in a snug fitting relationship.

Figure 15:
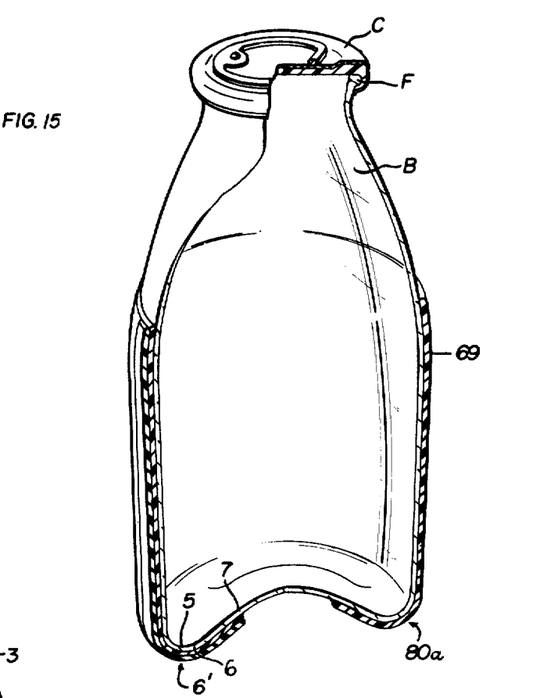
FIG. 15 is a front sectional perspective view of a container assembly made by the present invention and including a closure applied to seal product in the package.

After the sleeve is exposed to heat in tunnel 77, wherein the bottle is preferably rotated, the lower end of the plastic sleeve shrinks around the lower end corner radius of the bottle, indicated at 5 on FIG. 15 and along the bottom surface 7 of the bottle to form the annular plastic bearing ring at 6 for supporting the plastic covered bottle B on a level surface.

Referring again to FIG. 13, after the finished bottles B' with shrunken plastic covering thereon emerge from oven 77, the machine carriage 55 conveys them toward the unloading conveyor 81. The chuck assembly rollers 63 follow a downwardly inclined segment 64d of the cam track which abruptly lowers the bottle onto a firm and flat upper surface section 82 of conveyor 81. This bumps the bottle B' on surface 82 and any resulting irregularity in the seam portion of the shrunken plastic sleeve present in the bearing ring 80a at the bottle of bottle B' will be ironed out by this force. The bearing surface at the bottom end of the bottle will then be stable, removing any irregular bumps or the like to cause the bottle to be a "rocker," i.e., unstable when resting on a horizontal support.

As shown on FIG. 1, the conveyor 81 transfers the finished bottles to a location for packing and shipment or storage.

Figure 2:
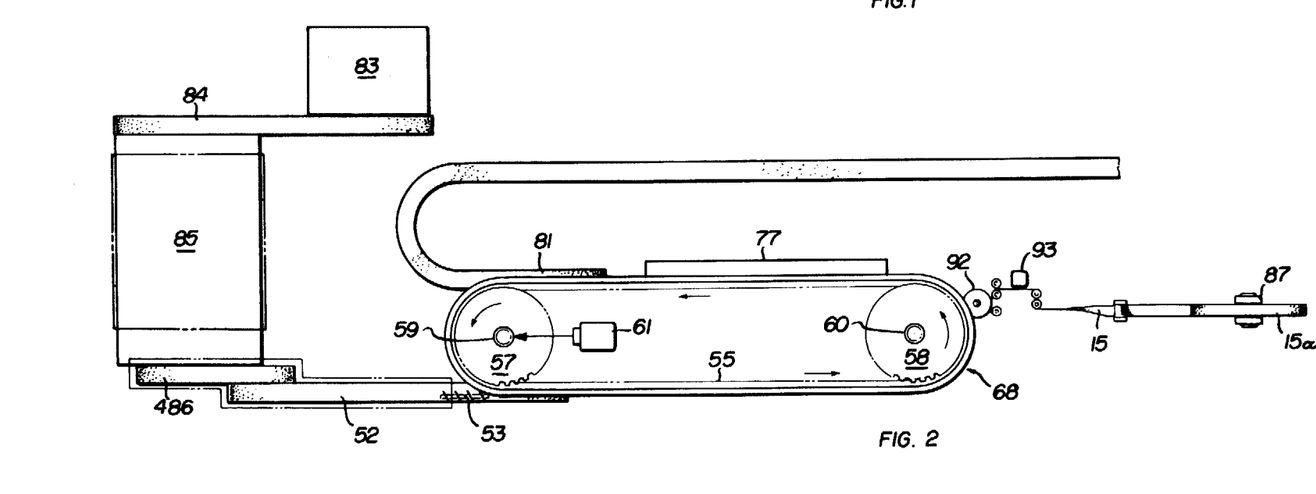
FIG. 2 is a top plan view like FIG. 1, but illustrating a second embodiment of the invention referred to herein as the "on-line" embodiment, wherein glass bottles are delivered from the annealing lehr of the bottle manufacturing line at an elevated temperature and loaded to the machine for applying the plastic sleeves, the latent heat of manufacture of the bottle being utilized in the application of the plastic sleeve.

ON-LINE EMBODIMENT — FIG. 2

The principal difference in the off-line embodiment of FIG. 1, just described, and the on-line embodiment of FIG. 2 resides in the supply of the hot blank or bare bottles B.

In the on-line embodiment, glass bottles are molded to final shape by a conventional bottle forming machine 83. The formed glassware (bottles B) are transferred by conveyor 84 to and through an annealing lehr 85. Lehr 85 is conventionally designed to operate so that glassware is received at temperatures around 800°–1,000°F from forming at machine 83. Allowing for cooling in transfer, the bottles may leave lehr 85 at around 400°F and be further cooled in the process to the desired 200°–220°F at the time the bottles and plastic sleeves are joined at the machine 68. Removal from lehr 85 will proceed through an unloading device 486 and be placed onto the machine conveyor 52. While in a line on conveyor 52, the infeed worm 53 will load the now hot bottles B onto the carriage 55 by the chucks 54. The preheater structure (see 65 in FIG. 1) may or may not be used. In any event, the distinguishing saving in the on-line embodiment is first the use of latent heat of manufacture of the bottles as the initial heat in the "hot bottles" for the process; and, secondly, the extra handling of the ware after annealing, such as packaging, palletizing, storage and the like, is avoided, thereby saving on production costs.

BOTTLE HANDLING APPARATUS

The apparatus for handling the bottles in the machine is shown on FIGS. 3–13. The infeed timing worm 53 operates to retard the bottles on the infeed conveyor 52 and space successive bottles in vertical axial alignment, or nearly so, with the overhead bottle chucks 54, such as the two chucks at the left hand side of FIG. 3. The chucks are mounted on carriage brackets 8 (FIG. 4) that are fastened to the upper and lower carriage chains 55a and 55b respectively. The brackets 8 each have rigid C-shaped upper and lower mounts 11 and 12 (FIG. 5) which receive a pivotal pin connection of the upper chain 55a and lower chain 55b respectively. A roller 13 is rotatably carried on stub shaft 14 extending vertically from each upper C-mount 11. As seen on FIG. 4, a horizontal stabilizer bar 9 is fastened to a group, say three, of the lower C-mounts 12 on the chuck brackets 8. Depending from bar 9 are three pivot pins 17 held in bosses 10 and spaced longitudinally and the pins 17 each rotatably carry a roller 16 running in lower slot 19. The rollers 13 and 16 travel in the respective upper track slot 18 and lower track slot 19, which track slots open in opposed relation to each other. The slots 18 and 19 serve as guides around the path of carriage apparatus 56 and are bolted onto frame 20 of the handling apparatus 56.

A center guide track 21 is fastened to frame 20 of handling unit 56 and receives the roller 22 pivotally connected to each chuck assembly bracket 8 at pivot pin 23. In the construction described, the chuck brackets 8 are pulled by the chain 55a and 55b in their endless path about end turn sprockets 57 and 58 of the handling unit 56 (see FIG. 1 or 2). As schematically shown on FIGS. 1 and 2, sprocket 57 is drivingly connected by a differential transmission and electric drive motor unit 61. This motor unit 61 is synchronously phase connected with the drive unit for the sleeve making turret and feed device so that the chain 55 may be driven in synchronism — phase and speed — with the sleeve making turret.

The chucks 54 are each vertically, slidably mounted by the vertical cylinder 24 set in vertical slide way 25 on the carriage bracket 8. The vertical position of cylinder 24 with respect to bracket 8 is controlled by the same roller 63 running in cam track 64 fastened to frame 20 of the handling apparatus 56 above guide track 18 by the pillow blocks 26 spaced along the guide track of the machine. Roller 63 is pivotally attached to the bracket 27 by pivot pin 28. The track 64 thus controls the vertical elevation position of the chuck cylinder 24 on the machine.

BOTTLE CHUCKS

The bottle chucks 54 are constructed to provide assured pick-up of bottles that are slightly misaligned; either misaligned longitudinally with the center of the chuck along the path, or misaligned laterally with the chuck on said path, or both. If the bottle is seriously misaligned, the chuck will avoid picking up the bottle and it will topple off the end of infeed conveyor 52 into a suitable receptacle. This prevents jam-ups on loading. Another feature of the chuck is the yieldable jaw mounting. If the misalignment of the bottle is serious and the lowering chuck jaw fails to clear past the finish rim F of the bottle, the individual jaw of the multi-jaw construction is independently yieldably mounted on the chuck. Tipped bottles and broken bottles from jam-ups or interference is avoided.

The cylinder housing 24 of each chuck has an upper sleeve 29 press fit in its upper end. Sleeve 29 provides a cylinder bore for axial sliding movement of the cam piston 30. Cam roller 31 is rotatably mounted on a shaft 32 on the upper yoke of piston 30. Axial sliding movement of piston 30 in cylinder sleeve 29 is limited by the radially extending pin 33 fastened through the wall of cylinder 24 and extending through sleeve 29. The inner end 33a of the pin extends into the space provided by a vertical slot 34 provided in the piston 30. The piston 30 engages the head 35 on chuck rod 36. Rod 36 extends axially of the chuck cylinder 24 and is housed in the hollow arbor member 37. Arbor 37 has upper and lower ball bearing supports 38 and 39. The collars of bearings 38 and 39 are press fit in annular recesses 40 and 41, respectively, on the inner wall of cylinder 24. Arbor 37 supports the chuck jaws and guides the chuck actuating rod 36. Rod 36 is spring loaded by spring 42 compressed between the cup recess 43 on arbor 37 and the under side of piston 30. The spring 42 normally extends the rod 36, piston member 30 and cam roller 31 upwardly, this upward movement being limited by pin 33a engaging the lower edge of slot 34.

The chuck 54 is supported from the collar 44 attached to the lower end of arbor 37. The collar 44 has a pulley wheel 251 attached rigidly to the chuck 54. The chuck is rotatable about its central axis in ball bearings 38, 39 and wheel 251 (FIG. 5) is arranged to engage, at certain times, a linear rail 250 having a face coating of friction material 250a, such as rubber. The rail 250 is fastened by a lateral bracket 252 to the carriage frame 56. The linear rail 250 is located along the span of the preheater 65 and the shrink oven 77 for selectively rotating the bottles in chucks 54 in those portions of travel about the carriage path. A circular plate 45 is fixed to the underside of collar 44 and has a center axial bore through which rod 36 extends for reciprocating movement. Near the periphery of collar 44 are three vertically depending leg members 46, each of which are substantially V-shaped in section (see FIG. 11). Three hinge pins span laterally between the legs 46 and provide a pivot for the three chuck jaws 54a. The jaws 54a are disposed about the actuating rod 36 at the sides of an equilateral triangle, rod 36 being located centrally of the triangular arrangement. Each of the chuck jaws 54a is fastened onto an inturned end 48 of a strap-like L-shaped holder 49 by cap screw 49a. Holder 49 is shiftably mounted on rock arm 78, its lower end being pivotally supported by pin 47 in the adjacent leg members 46. The means for mounting holder 49 onto rock arm 78 provides quick detachment of the chuck jaws 54a for maintenance or size change, and provides a safety feature, as will be presently described. Each rock arm 78 has two outwardly facing studs 79, each having enlarged heads or buttons.

Figure 9:
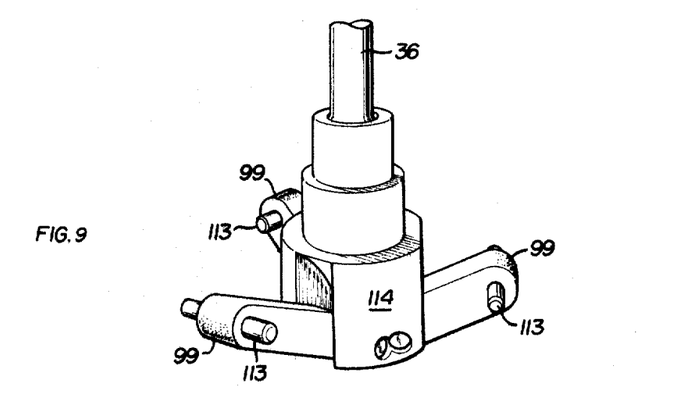
FIG. 9 is a perspective view of a portion of the bottle chuck of FIG. 6.

The L-shaped jaw holders 49 have aligned, vertically elongated slots 80, each slot having an end enlargement 86. The main segment of slots 80 are slightly larger than the stud 79 diameter so as to allow sliding movement of studs 79 along slots 80. The end enlargement portion 86 permits passing the button end enlargement of studs 79 therethrough in quick assembly or disassembly of the holders 49 on the rock arms 78. Each rock arm 78 has a link 99 connected to it at an intermediate point by a pin 113. Link 99 is a part of the actuator assembly for the chuck shown on FIG. 9. Links 99 are pivotally attached at their inner ends to a hub 114 and the hub is connected securely to the lower end of the chuck actuator rod 36. Just above hub 114 is a center journal 115 that is integrally connected to the vertical leg members 46 by the bracket arm 116, as shown by FIG. 10.

Figure 6:
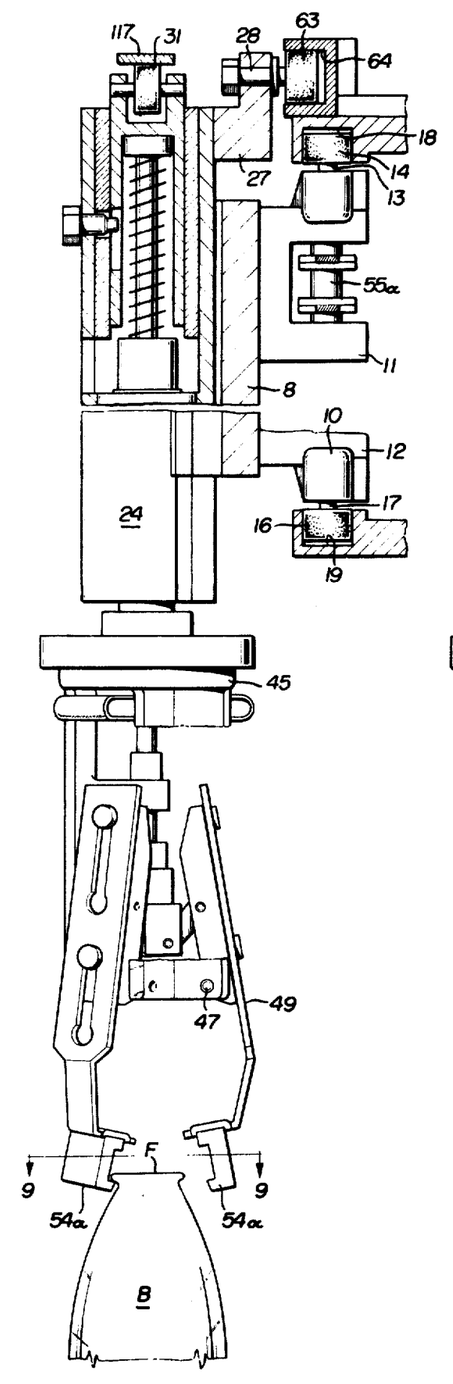
FIG. 6 is an elevational view, partly in section, showing the chuck apparatus of the invention at the loading station on the machine.
Figures 10, 11, 12:
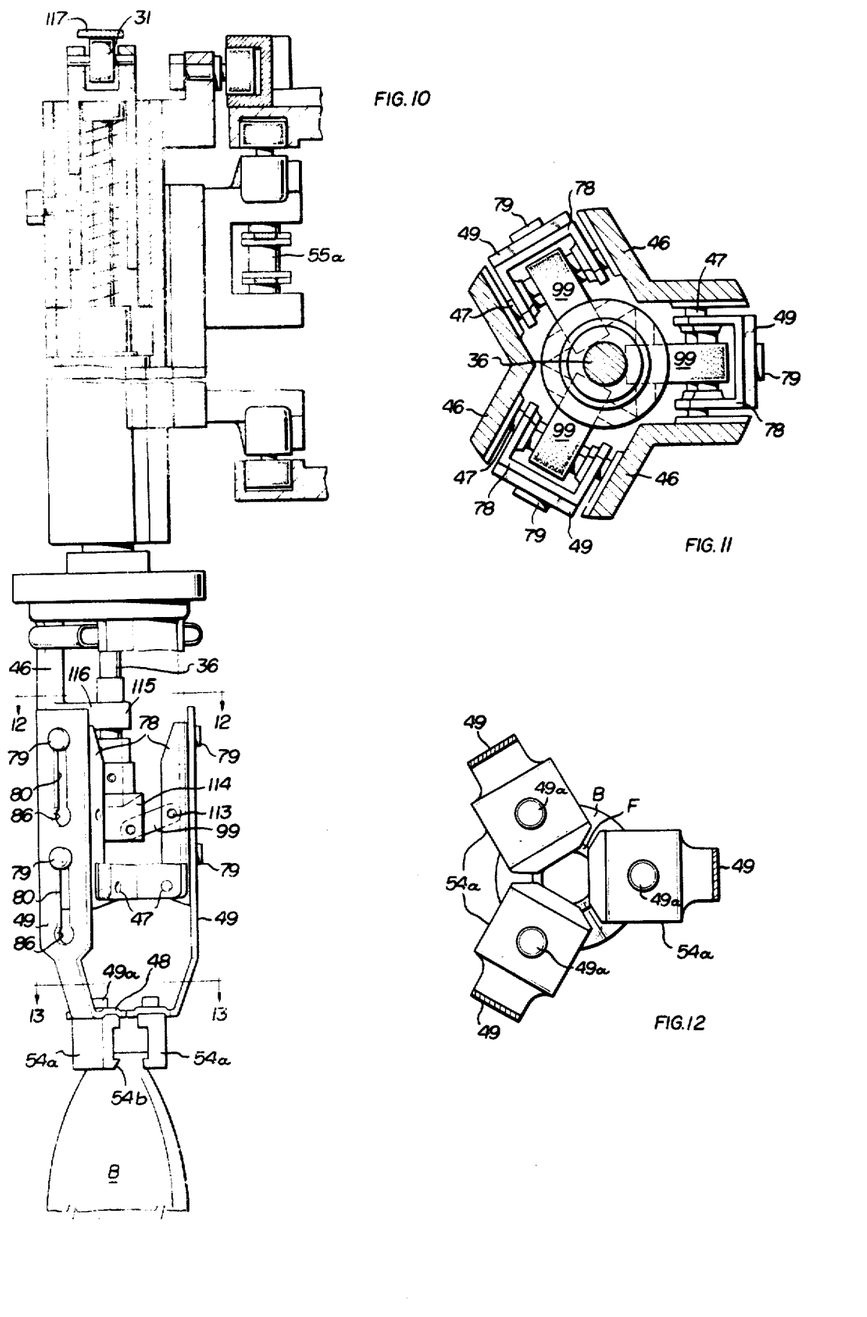
FIG. 10 is a side elevational view, partly in section, of the bottle chuck in its raised position for transporting a bottle on the machine.
FIG. 11 is a sectional plan view taken along line 12—12 of FIG. 10.
FIG. 12 is a sectional plan view taken along line 13—13 on FIG. 10.

Referring to FIGS. 6 and 10, the "open" and "closed" position of the chuck 54 are shown. In the open position (FIG. 6), cam roller 31 is engaged on cam 117 shifting piston 30 and actuator rod 36 downwardly further compressing spring 42. The downward movement of rod 36 lowers hub 114 causing rock arms 78 to pivot inwardly about the end pin 47. On FIG. 6, the right-hand rock arm rocks in a counter-clockwise direction about pin 47. Rocking arms 78 in this fashion moves the jaws 54a of the chuck away from the center or axis and opens them with respect to the finish F of the underlying bottle B. The jaws 54a are closed by the reverse reciprocal movement of rod 36 under raised contour of cam 117 and spring 42. This is shown on FIG. 10. The upward movement of the hub 114 pivots rock arms 78 to close the chuck and the lower radial ledge 54b of each jaw 54a closes under the finish bead of the bottle B. The bottle is then held and suspended by the bead finish F engaged by the three jaws at their ledge 54b.

LOADING STATION

Referring to FIG. 3, the bottles are loaded to the handling apparatus by the combined timing of the bottles on the conveyor 52 by the worm 53, the manipulation of the elevation of the chucks 54 by the cam track 64, and operation of the jaws of the chucks by the chuck cam 117. As the bottle B leaves the timing worm 53 advancing left to right on FIG. 3, the chuck is over the bottle and moving at the same speed in that direction. Cam 64 then slopes downwardly so as to drive the chuck cylinder 24 (FIG. 6) downwardly. The jaws of chuck 54 are simultaneously held open by a cam 117 through this same span of travel until the jaws 54a of the chuck surround the bottle finish F. At this point, the contour of cam 117 rises abruptly and spring 42 closes the chuck jaws as shown on FIG. 10. Thereafter the cam track portion 64b (FIG. 3) raises. The chuck assembly 54 and bottle B held thereby is raised from the conveyor 52.

Figure 7:
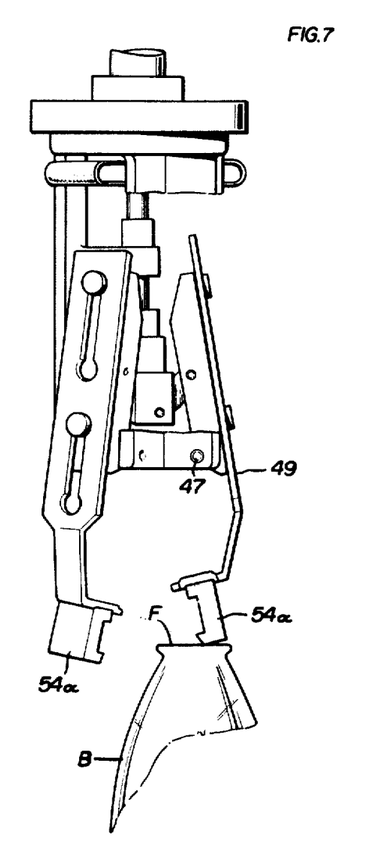
FIG. 7 is a side elevational view of the lower portion of the FIG. 6 apparatus illustrating a feature of the bottle chuck.
Figure 8:
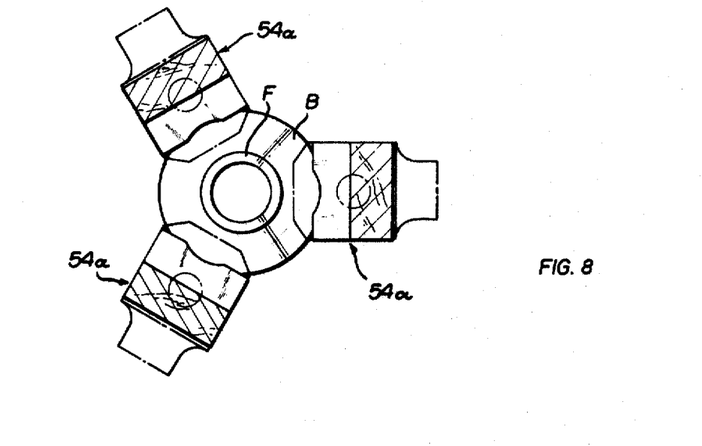
FIG. 8 is a sectional plan view taken along line 9—9 on FIG. 6.

The just described operation provides for engaging bottles by the handling apparatus if the bottles are substantially centered under the chuck jaws. Some misalignment of the circumference of finish F is permissible with this apparatus and the bottle will be picked up from the conveyor, that is, the axial center of the bottle and the axial center of the chuck at the time the bottle is picked up need not be exactly centered and aligned. The tolerance allowable for a successful engagement of the bottle is summarized as follows: If the perimeter of the finish bead of the bottle is within the inner circular confine of the lip 54b of the jaws while in open position, though off of center, the jaws upon closing will move the bottle into chucked position as the jaws close. This is illustrated on FIG. 6. On the other hand, if the bottle is seriously misaligned with the chuck so that the perimeter of the bead finish is outside the inner circle prescribed by the gripping lip 54b, the bottle will not be picked up. A jam-up or breakage of the bottle in this latter situation is avoided by the unique structure of the chuck. As the chuck assembly is lowered by track 64 and a jaw 54a is moved into an interference engagement with the top of the bottle, such as in FIG. 7, the mounting of holder 49 on its rock arm 78 permits jaw 54a to yield upwardly by virtue of holder 49 being relatively freely slidable up the rock arm 78 along the slots 80. The studs 79 retain and guide holder 49 along these slots. Since the bottle in this case will not be engaged by the chuck 54 to be picked up, the conveyor 52 (FIG. 3) will dump the misaligned bottle off the end of conveyor 52 into a suitable receptacle (not shown).

The linear spacing between axial centers of the successive chucks 54 (e.g., see FIG. 4) is equal and this spacing is also equal to the spacing between vertical centers of the sleeve forming mandrels 66 on the turret mechanism, to be presently described. The infeed worm 53 has a pitch that will provide spacing of the successive containers B on conveyor 52 equal to the center-to-center spacing of successive chucks 54. Speed synchronization of worm 53 with linear speed of conveyor chains 55 and conveyor 52 is provided by a synchronous drive and phase synchronization and adjustment of worm 53 is achieved by a known PVI unit (not shown) in the drive to the worm. By this means, the ware phase spacing on the conveyor may be timed with the chucks. The motor drive 61 that is connected to operate the chains 55, conveyor 52 and worm 53 is electrically synchronized with the drive transmission for the sleeve making turret 67, to be presently described.

UNLOADING STATION

Figure 13:
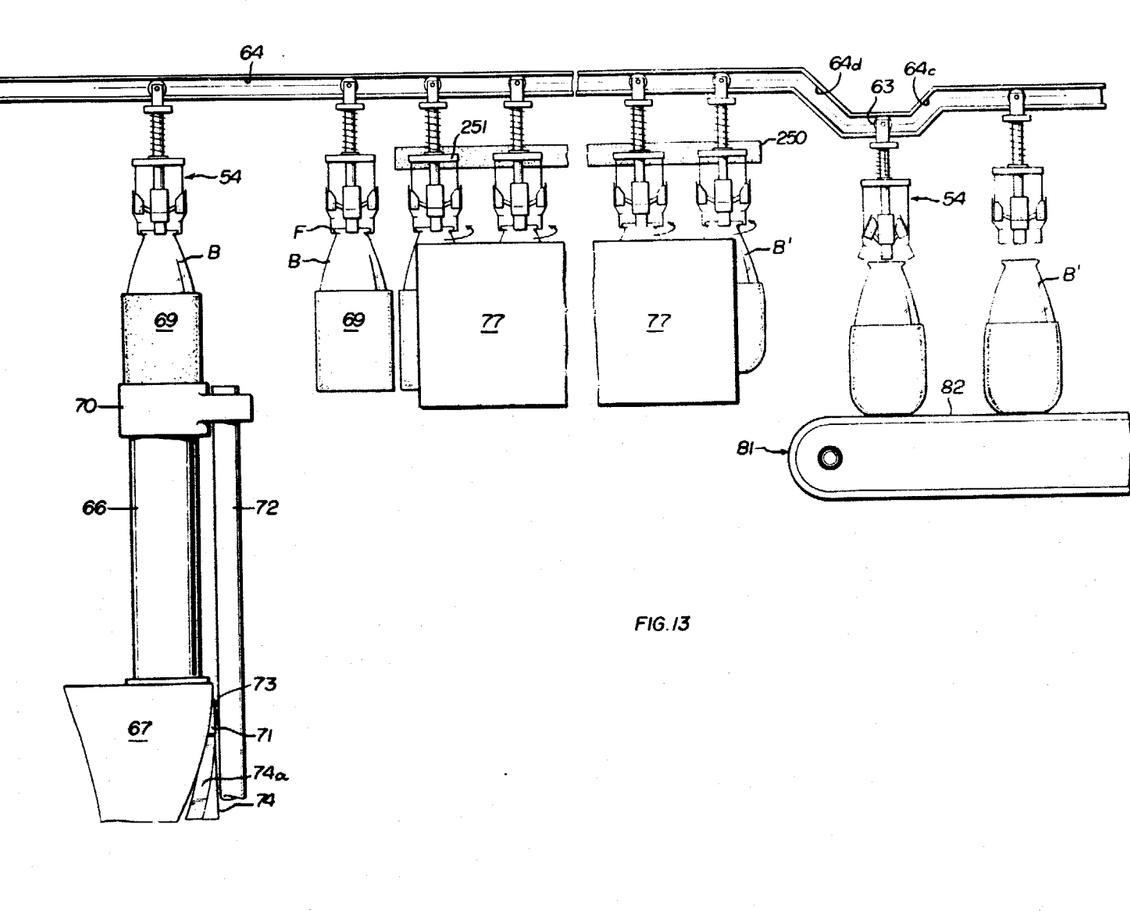
FIG. 13 is is a side elevational view of the bottle handling apparatus at the side of the machine for heat shrinking the plastic sleeve onto the bottle and delivery of the bottle to the outfeed conveyor.

As has been described hereinbefore, the bottles and sleeves thereon are carried on the chucks 54 and axially rotated thereby through the tunnel oven 77 wherein the sleeves shrink into snug conforming relationship on the bottles. Referring to FIG. 13, rotation of the chucks is effected by their pulley 251 running on the friction material at the face of the longitudinally extending rail 250. The rail is similarly mounted to the carriage frame in a manner shown and described earlier herein on FIG. 5; whereupon, the bottles emerge from the oven and immediately before the unloading conveyor the overhead carriage track dips abruptly in section 64d thereof (see FIGS. 4 and 13). This lowers the bottle with a firm bump onto the top surface 82 of the conveyor. In so doing, the covering on the bottom of the bottle is ironed flat and any protrusions or uneven segments in the bottom covering on the bottle bearing surface will be squared or evened with the bottle. This prevents "leaners" or uneven bottoms on the plastic covered bottom surface. After the "bumping" operation, the chuck cam 117 and roller 31 engage (such as on FIG. 6) to open the chuck and release the bottle to conveyor 81.

The invention is disclosed in connection with manufacture of a glass bottle; however, many advantages of the invention may be realized in combining the plastic sleeve with containers or bottles made of other materials.

Other and further modifications may be resorted to without departing from the spirit and scope of the appended claims.

We claim:

1. A chuck for supporting an article comprising
    a housing,
    an elongate rod mounted in said housing for axial reciprocal movement, and extending outwardly of said housing,
    outwardly depending leg means connected to said housing and radially spaced from and about the outer extending portion of said rod, means attaching said hub means on said outwardly extending portion of said rod for movement therewith, a plurality of elongate jaw holders comprising plural lever means pivotally connected intermediate their ends on said leg means and spaced radially about said hub means, each having a chuck jaw attached adjacent one end thereof and a pivot link connected to the lever spaced from the pivotal connection and opposite said one end, said link also being pivotally connected to said hub means, said lever means comprising elongated rock arms, plural outwardly projecting studs spaced longitudinally of said arms, said jaw holders having longitudinal slots receiving said studs supporting the holder on the rock arm for longitudinal movement, each said holder being independently longitudinally shiftable on said rock arms upon interference in axial movement of the chuck jaws, means engaging said rod for axially moving said hub means toward said housing, said link means pivoting said jaw holders collectively on said leg means to close the chuck jaws about an article, and means engageable with said rod for axially moving the hub means away from said housing, whereby the link means pivots said jaw holders collectively to open the chuck jaws.

2. The chuck defined in claim 1 wherein said housing includes an elongate hollow arbor means journaled about said rod, means mounting said arbor means in said holder for rotation about the rod axis, a collar attached on the end of the arbor means, and means attaching said leg means on said collar.

3. The chuck defined in claim 1 wherein the means engaging the rod for moving the hub means in closing the jaws comprises spring means connected to said housing and said rod compressed for normally urging movement of the rod inwardly with respect to the housing.

4. The chuck defined in claim 1 wherein the means engageable with said rod for moving the hub means in opening the jaws comprises a cam follower and means connecting the cam follower to the rod opposite the hub means adapted for operation to open said jaws.

5. A chuck for supporting an article comprising a housing, an elongate rod means mounted in said housing for axial reciprocal movement, a plurality of movable chuck elements for engaging the article each including an elongate holder having a chuck jaw attached adjacent one end thereof, hub means connected with said rod for movement therewith, rock arms pivotally attached to said housing intermediate their ends and mounting them in radially spaced apart relationship on said hub means, link means pivotally connected on said hub means and connected near one end of each of said rock arms, spaced studs on said rock arms, cooperating elongated slots on said holders, the holders being supported on the rock arms for independent longitudinal movement, and means operable for moving said rod means in opposite directions alternately for closing said chuck jaws collectively about an article and for opening the chuck jaws.

6. A chuck defined in claim 5 further comprising means for rotating said rod about its axis.

7. A chuck defined in claim 5 further comprising resilient means axially biasing said rod means in a direction urging said hub means toward an article clamping position, and stop means defining an end limit of axial movement of said rod means in said direction.

8. A chuck for supporting a container in upright position wherein the container has a mouth opening defined by an annular rim at its upper end and has a longitudinal axis of symmetry comprising a housing, an elongate rod mounted in said housing for axial movement, a hub connected on the outer end of said rod, plural elongate arms, means pivotally connecting each of said arms to said housing axially outwardly from said hub, said arms being peripherally spaced about said hub for rocking movement toward and away from the axis of said rod, link means respectively pivotally connected to each of said arms and said hub for rocking said arms, plural chuck elements for annularly engaging the upright container about its rim, each said element comprising an elongate holder, a detachable connecting means yieldably attaching said holder on a rock arm for longitudinal sliding movement of the holder on the arm, each said element including a chuck jaw at the outer end of its said holder, said detachable connecting means permitting longitudinal movement of a holder and chuck jaw upon interference engagement between a misaligned container and a chuck jaw thereof, and means connected to said rod for axially moving the latter, the link means being operated upon movement of the rod in either direction to open or close the chuck elements collectively about a container.

9. The chuck defined in claim 8 further comprising elongate leg means rotatable on said housing about the rod axis, the rod being concentrically mounted in said leg means for axial movement, and the rock arms each being pivotally connected to said elongate leg means.

10. A chuck defined in claim 9 in which said elongate leg means comprises three elongate legs each having a chuck element pivotally connected thereon, said legs being disposed in circular array and equally spaced around the axis of said rod.

11. A chuck defined in claim 9 further comprising a rotary drive element connected to said elongate leg means for rotating the chuck elements collectively about the axis of the rod.

12. A chuck for supporting an article upon closing about the article comprising a housing, rod means, a hub connected on one end of said rod, plural elongate arms, means pivotally connecting each of said arms to said housing axially outwardly from said hub, said arms being peripherally spaced about said hub for rocking movement toward and away from the axis of said rod, link means respectively pivotally connected to each of said arms and said hub for rocking said arms, plural elongated chuck elements, detachable connecting means yieldably attaching said elements on a rock arm for limited longitudinal sliding movement thereof on the arm, each chuck element including a chuck jaw at its outer end, for engaging the article, said detachable connecting means permitting longitudinal movement of said elements upon interference with the article prior to closing about the article, and means connected to said rod for axially moving the latter, the link means being operated upon movement of the rod in either direction to open or close the chuck elements about a container.

* * * * *